United States Patent [19]

English

[11] Patent Number: 4,904,841

[45] Date of Patent: Feb. 27, 1990

[54] WELDER SYSTEM HAVING CONTROLLABLE DUAL WINDING ALTERNATOR

[76] Inventor: Dale L. English, 5405 Wild West Dr., Arlington, Tex. 76017

[21] Appl. No.: 232,478

[22] Filed: Aug. 15, 1988

[51] Int. Cl.[4] .............................................. B23K 9/00
[52] U.S. Cl. .................................. 219/133; 219/137.71
[58] Field of Search ............ 219/133, 134, 132, 137.71

[56] References Cited

U.S. PATENT DOCUMENTS

| | | | |
|---|---|---|---|
| 4,314,195 | 2/1982 | Muter | 219/133 |
| 4,454,464 | 6/1984 | Stroud | 219/133 |
| 4,508,954 | 4/1985 | Kroll | 219/132 |

FOREIGN PATENT DOCUMENTS 2234070 10/1979 Fed. Rep. of Germany ...... 219/133

Primary Examiner—Clifford C. Shaw
Attorney, Agent, or Firm—James E. Bradley

[57] ABSTRACT

A welding system is disclosed having an alternator which includes two overlapping delta configuration three-phase stator windings of differing gauge. An ordinary welding rod may be utilized or, a supply or consumable welding wire may be coupled to the output of the alternator and advanced by means of a wire feeder in response to the actuation of a trigger control. A control circuit is then utilized to selectively activate a rotatable electric field winding within the alternator in response to the actuation of the trigger control such that the welding wire is "hot" only during actual welding operations.

5 Claims, 3 Drawing Sheets

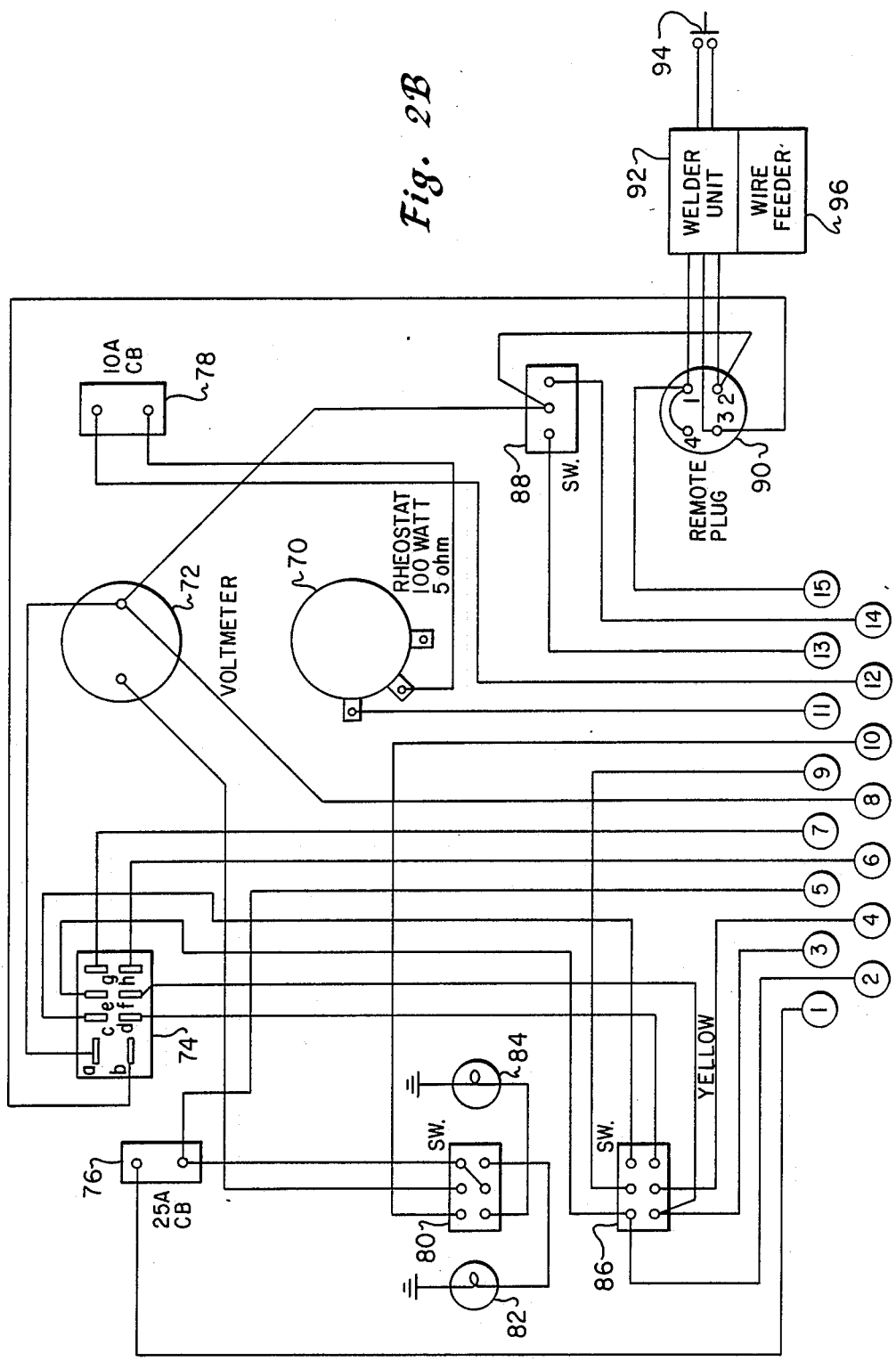

WELDER SYSTEM HAVING CONTROLLABLE DUAL WINDING ALTERNATOR

BACKGROUND OF THE INVENTION

1. Field of the Invention:

This invention relates in general to electric welding systems and in particular to electric welding systems having alternators with remotely controllable outputs. Still more particularly the present invention relates to alternators for use in welding systems which incorporate dual three-phase windings.

2. Description of the Prior Art:

Electric welding units are well known in the prior art. Such units typically include a prime mover, usually an internal combustion engine, which is mechanically coupled to an alternator or generator utilized to generate the voltages necessary for welding.

Several different electric welding techniques are known. For example, so-called "stick" welding utilizes welding rods which are consumed by the electric arc generated between the rod tip and the workpiece. In contrast, heliarc TIG welding or "Tungsten Inert Gas" welding utilizes a high frequency AC voltage and nonconsumable tungsten tips for welding aluminum or other similar metals. Finally, MIG welding or "Metallic Inert Gas" welding generally utilizes a consumable welding wire which is generally copper-coated steel. The wire is preferably supplied on a reel and is fed out through a welding unit by a wire feeder.

Conventional stick welders or MIG welders generally utilize four pole, sixteen slot alternators and provide a 60-120 cycle per second pulsated DC output while TIG welding units require a relatively high frequency AC signal source. Thus, it is not possible to utilize a single welder system to do both TIG and MIG welding. Also, it is necessary with known welding units to switch off the unit at the prime mover or main control panel to remove the voltage present at the rod or welding tip. This results in the possibility of accidents occurring while the operator is attempting to turn the unit off.

Many different alternator designs are known and may be utilized to generate the electrical current necessary to perform welding functions. Of the multiple phase alternator designs the delta and wye designs are the most commonly utilized. A wye winding will provide excellent low-speed generation while a delta winding produces better results at high speed. Recently, Motorola Corporation has developed a dual winding alternator which incorporates both a wye and a delta winding in an effort to blend both characteristics; however, this alternator design does not provide the high peak voltages necessary to perform electric welding.

It should therefore be apparent that a need exists for an electric welding system which can perform both MIG and TIG welding and which produces high peak voltages under various loading conditions.

SUMMARY OF THE INVENTION

It is therefore one object of the present invention to provide an improved electric welding system.

It is another object of the present invention to provide an improved electric welding system which permits the welding current to be controlled remotely at the welding unit.

It is yet another object of the present invention to provide an improved electric welding system which incorporates a dual winding alternator capable of providing peak voltages under multiple operating conditions.

The foregoing objects are achieved as is now described. The welding system of the present invention includes two overlapping delta configuration three-phase stator windings of differing gauge. An ordinary welding rod may be utilized or, a supply of consumable welding wire may be coupled to the output of the alternator and advanced by means of a wire feeder in response to the actuation of a trigger control. A control circuit is then utilized to selectively activate a rotatable electric field winding within the alternator in response to the actuation of the trigger control such that the welding wire is "hot" only during actual welding operations.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A and 2B form a composite schematic diagram of the welding system of the present invention.

DETAILED DESCRIPTION OF THE INVENTION

Figure 1:
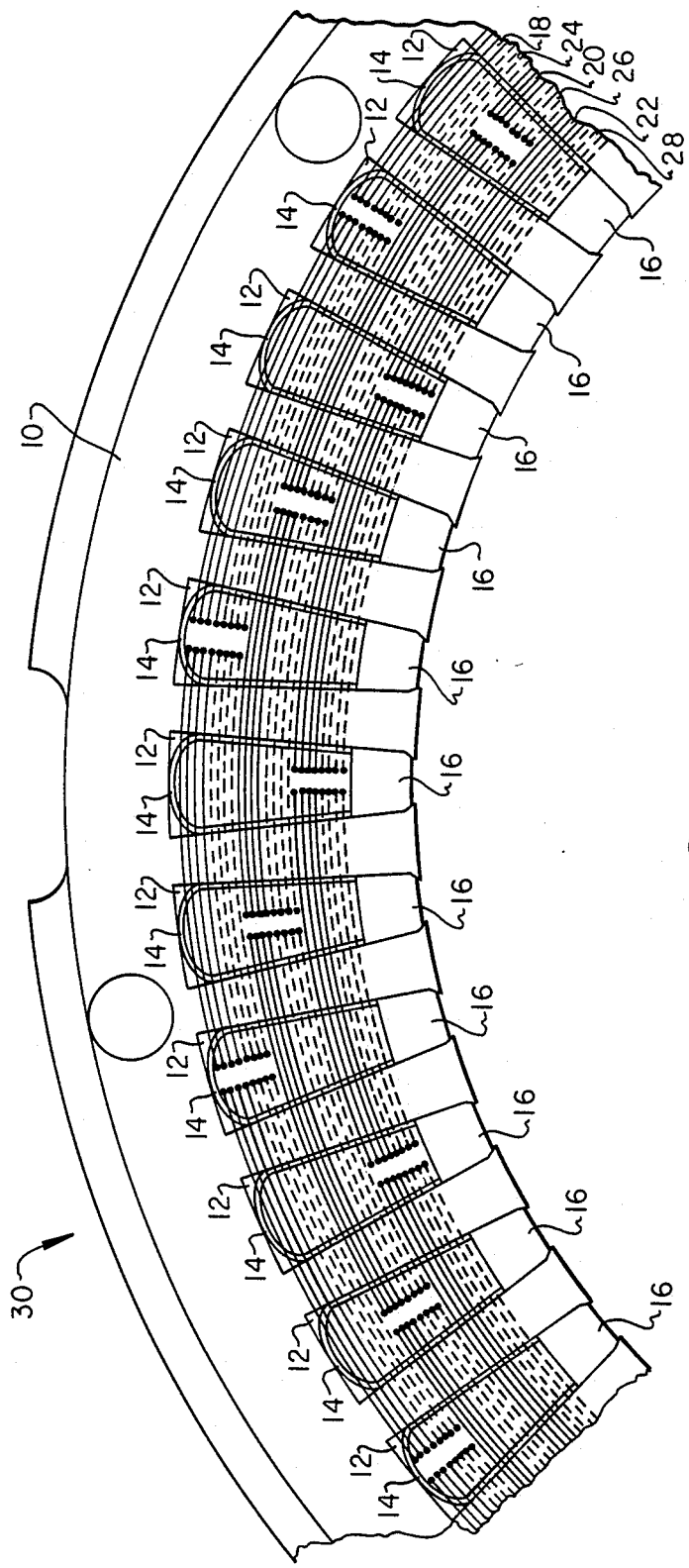
FIG. 1 is a representation of an arcuate section of the stator of the dual winding alternator utilized with the welding system of the present invention.

With reference now to the figures and in particular with reference to FIG. 1, there is depicted a representation of arcuate section 30 of the stator of the dual winding alternator which is utilized with the welding system of the present invention. As may be seen, arcuate section 30 includes a ferromagnetic core 10 which is generally fabricated by laminating multiple layers of ferromagnetic material. In a preferred embodiment of the present invention, ferromagnetic core 10 includes forty-eight slots 12, each of which extends in a direction parallel to the axis of the stator. Each slot 12 is lined with an insulating insert 14 which is utilized to prevent electrical contact between individual windings and ferromagnetic core 10.

As is illustrated, ferromagnetic core 10 is wound with two sets of three-phase windings. A first set of windings includes windings 18, 20, and 22 which are each wound around three segments of ferromagnetic core 10. Since ferromagnetic core 10 includes fortyeight segments, each phase will include sixteen coils. In a preferred embodiment of the present invention, windings 18, 20, and 22 are provided by utilizing 13 A.W.G. electrically conductive wire which is coated with electrical insulation.

In accordance with an important feature of the present invention, a second set of three-phase windings including windings 24, 26, and 28 are also provided. As may be seen, winding 24 overlies winding 18 and is wrapped into the same slots within ferromagnetic core 10. Similarly, winding 26 overlies winding 20 and winding 28 overlies winding 22. Windings 24, 26, and 28 are provided by utilizing 18 A.W.G. electrically conductive wire which is also coated with electrical insulation. Finally, an insulated plug 16 is utilized to retain the various winding coils within each slot 12.

Each set of three-phase windings, as depicted in the illustrated embodiment of the present invention, is coupled together in a delta configuration. The outputs of each set of windings are then coupled to a full wave rectifier diode bridge. The Applicant has discovered that by utilizing the winding configuration depicted herein wherein dual three-phase windings of differing gauge are coupled in series, it is possible to produce a higher peak voltage throughout the entire operating range of the alternator.

Figure 2A:
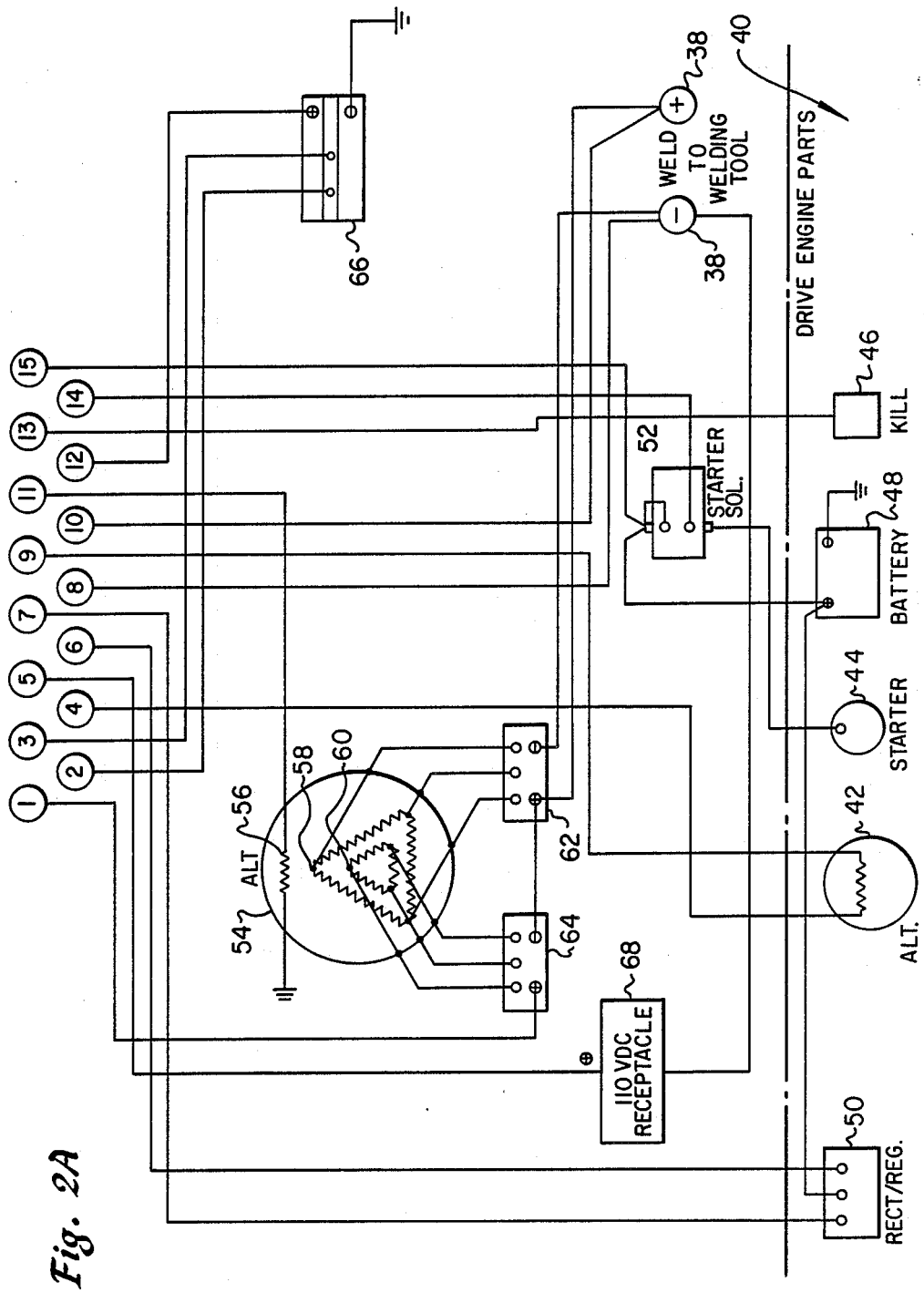

Referring now to FIGS. 2A and 2B, there is depicted a composite schematic diagram of the welding system of the present invention. As is illustrated, the welding system includes a drive engine 40 which is preferably an internal combustion engine. Drive engine 40 is utilized, in a manner well known in the prior art, to drive a rotatable electric field within a stationary stator in order to generate electrical voltages necessary for welding. Drive engine 40 also preferably includes an alternator 42 which is utilized, in a manner well known in the engine art, to generate electrical voltages for various uses. Starter 44 is provided for starting drive engine 40 and is selectively powered by storage battery 48 in response to operation of starter solenoid 52. Kill switch 46 is utilized to stop drive engine 40 when desired. Finally, rectifiers/regulator 50 is utilized to rectify and regulate the output of alternator 42 during selected periods of operation to charge storage battery 48 or provide the field voltage necessary for the operation of the welding system, as will be described in greater detail herein.

Still referring to FIGS. 2A and 2B, alternator 54 is depicted. As may be seen, alternator 54 includes a rotatable electric field winding 56 and delta configured windings 58 and 60, which are wound in the manner depicted in FIG. 1 utilizing two dissimilar gauge wires. The output of delta winding 58 is coupled to full wave rectifier diode bridge 62 and similarly, the output of delta winding 60 is coupled to full wave rectifier diode bridge 64. As is illustrated, diode bridge 62 and diode bridge 64 are coupled in series with the output of diode bridge 62 being coupled to welding output terminals 38, which may then be coupled to a selected welding tool. The negative terminal of welding outputs terminals 38 is also coupled to the negative terminal of receptacle 68 which may be utilized to provide DC a power supply for selected DC operated hand tools. The positive terminal of receptacle 68 is coupled, via circuit breaker 76, to the positive terminal of diode bridge 64. In this manner, receptacle 68 may be utilized to provide the highest DC voltage present in the welding system of the present invention and may generate, utilizing the system depicted herein, up to 110 volts DC.

Referring again to alternator 42, the output thereof is selectively coupled, via switch 86 to diode bridge 66 while switch 86 is coupling its leftmost and center terminals. The output of diode bridge 66 is then utilized, via circuit breaker 78 and rheostat 70 to provide a selectable voltage which may be applied to rotatable electrical field winding 56. This configuration is utilized during so-called "stick" welding wherein the output of alternator 54 is continually applied to welding output terminals 38.

Alternately, while switch 86 is coupling its rightmost terminals to its center terminals, in the socalled "remote" or MIG position, voltage is coupled to rotatable electric field winding 56 only after activation of relay 74. Relay 74, is preferably provided by utilizing a standard 120 volt DC relay such as the Model No. W78RCSX-7 manufactured by Magna Craft Electric Company of Chicago, Illinois. In accordance with an important feature of the present invention, relay 74 is selectively activated during operation of welder unit 92 which is coupled to remote plug 90. Welder unit 92 is preferably a "suit-case" MIG welder such as the Model No. SC112, manufactured by C-K Systematics, Inc. of Westchester, Pennsylvania.

Welder unit 92 preferably includes a wire feeder 96 which is utilized to store a supply of consumable welding wire which is advanced or fed by a DC powered electric motor (not shown) in response to actuation of trigger switch 94. Momentary actuation of trigger switch 94 is utilized to couple pins 4 and 3 of remote plug 90 which then in turn may be utilized to apply power to relay 74. In this manner, the wire supplied by wire feeder 96, while coupled to the output of alternator 54 through welding terminals 38, will not be "hot" unless trigger switch 94 is closed. It should be noted that storage battery 48 is coupled to pin 1 of remote plug 90 and utilized, in accordance with the depicted embodiment of the present invention, to provide power to the direct current motor within wire feeder 96.

Switch 80 is utilized, in conjunction with indicator lamps 82 and 84 to provide a visual indication of the mode of operation of the welding system of the present invention. Switch 88 is utilized to energize the starter solenoid 52 or kill switch 46, as desired, and voltmeter 72 provides a visual indication of the output voltage of the system.

As those skilled in the art will appreciate, by providing an alternator having forty-eight slots and rotating the electrical field therein at a sufficiently high frequency, it is possible for the output of alternator 54 to produce approximately 5000 cycles per second of pulsated DC. This high frequency may be utilized to provide either MIG or TIG welding techniques in view of the novel winding of alternator 54 which permits the output of alternator 54 to remain at or near peak voltage throughout the operating range of alternator 54. In fact, the Applicant has discovered that by providing an output voltage at this frequency, it is possible to MIG weld utilizing coppercoated steel wire without the necessity of utilizing the inert gas supply, which known MIG welding systems require. Additionally, those skilled in the art will appreciate that by selectively providing voltage to rotatable electric field winding 56 only during actuation of wire feeder 96 the welding system of the present invention will be inherently safer to operate due to the lack of voltages at the welding unit when welding is not being accomplished.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An electric welding system comprising:

an internal combustion engine;

a storage battery for use in starting said internal combustion engine;

a first alternator coupled to said internal combustion engine for generating electricity in response to a relative rotation between an electric field and a plurality of windings;

a supply of consumable welding wire coupled to the output of said first alternator;

a wire feeder for advancing said consumable welding wire including a direct current electric motor wherein said direct current electric motor is selectively coupled to said storage battery for operation thereof in response to the actuation of a trigger; and control means coupled to said first alternator and said trigger for actuating said electric field in response to actuation of said trigger.

2. The electric welding system according to claim 1 wherein said plurality of windings comprises multiple windings configured in a three-phase winding.

3. The electric welding system according to claim 1 wherein said internal combustion engine includes a second alternator driven by said internal combustion engine and wherein the output of said second alternator is utilized to provide said electrical field.

4. The electric welding system according to claim 3 further including a rheostat coupled between the output of said second alternator and said electrical field wherein said electrical field may be varied in intensity by operation of said rheostat.

5. The electric welding system according to claim 1 wherein said consumable welding wire comprises copper-coated steel wire.

* * * * *